Nov. 21, 1950     J. E. REAM     2,530,728

SAFETY TOP FOR BABY BEDS

Filed March 9, 1949

J. E. Ream
INVENTOR

BY C. A. Snow & Co.
ATTORNEYS.

Patented Nov. 21, 1950

2,530,728

UNITED STATES PATENT OFFICE 2,530,728

SAFETY TOP FOR BABY BEDS

John E. Ream, Portsmouth, Ohio

Application March 9, 1949, Serial No. 80,536

3 Claims. (Cl. 5—97)

This invention relates to a safety top for use on baby beds, the primary object of the invention being to provide a top which may be moved to its closed position, closing the top of the bed to prevent a baby or infant lying in the bed, from climbing over the sides of the bed which frequently results in injury to the baby, by falling.

An important object of the invention is to provide a device of this character which may be readily and easily positioned on the usual baby bed, without the necessity of making alterations in the bed structure to mount the safety top, since it is desirable to remove the top completely, after the baby reaches the age where the baby may climb into and out of the bed without danger of injury.

A still further object of the invention is to provide a hinge for the safety top having means for gripping the safety top supporting it in its open position while a baby is being placed in the bed or removed therefrom.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing

Figure 1:
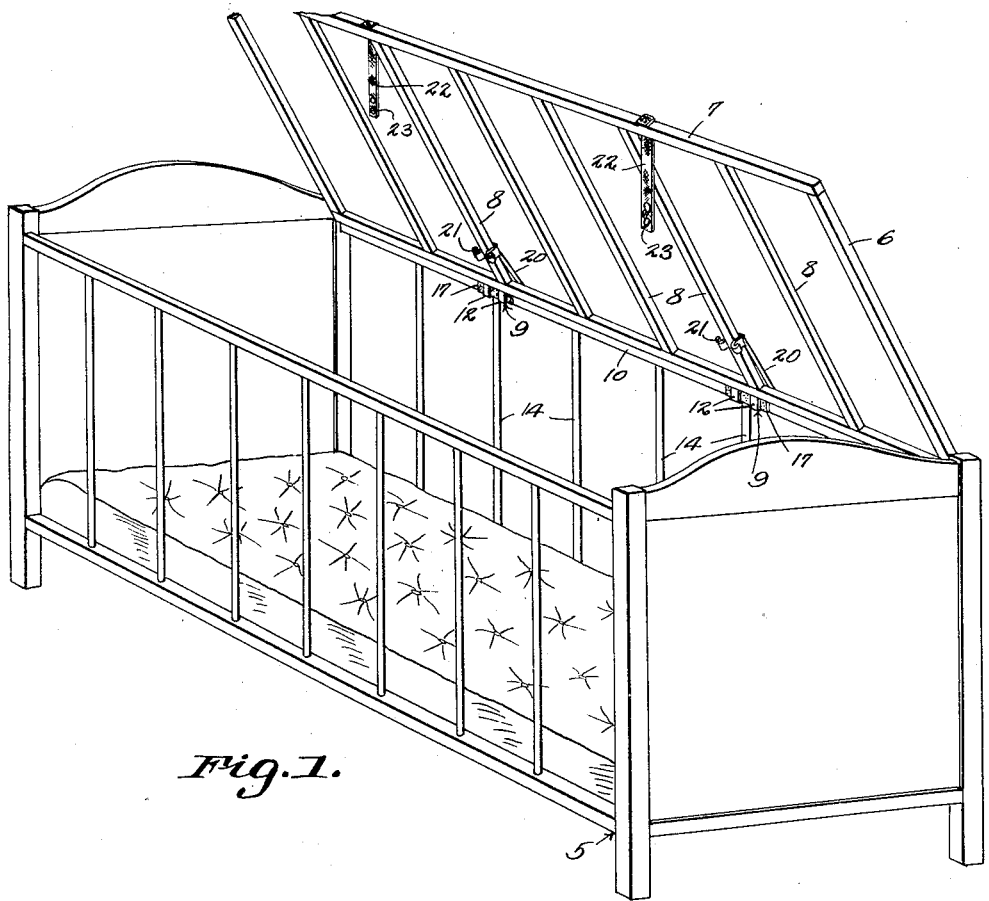
Figure 1 is a perspective view of a baby bed illustrating the safety top as positioned thereon, the safety top being shown in its open or elevated position permitting of ready access to the bed.
Figure 2:
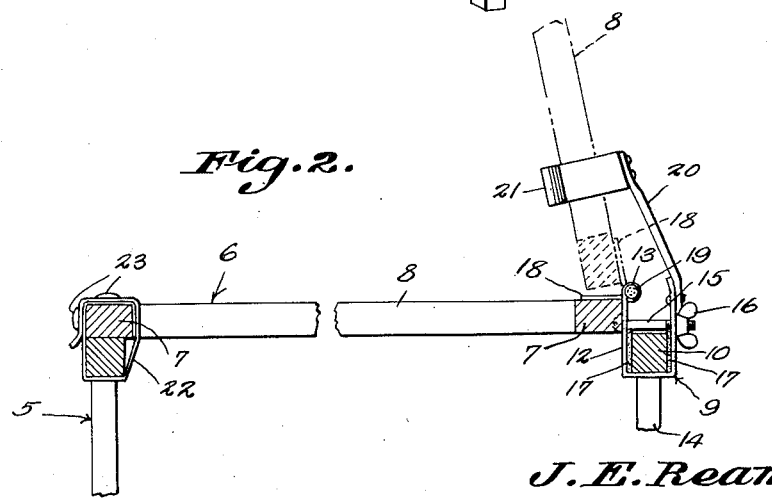
Fig. 2 is a transverse sectional view through the bed illustrating the construction of the hinge which is used in removably securing the safety top to the bed.

Referring to the drawing in detail, the reference character 5 indicates a baby bed which is of the conventional structure, the bed being provided with the safety top 6, forming the subject matter of the present invention.

This safety top or cover 6 is constructed of parallel side members 7 connected by transverse members 8, the safety top being so constructed that it will fit within the head and foot members of the bed.

The removable hinges by means of which the safety top is secured to the bed, embody a plate 9 bent upon itself providing a substantially U-shaped member to be fitted over the side bar 10 of the bed.

The plate 9 is formed with a cut out portion extending from one edge thereof providing spaced arms 12 that have their upper ends bent rearwardly providing tubular hinge sections 13, the space between the arms 12 being sufficient to permit the arms to be positioned at opposite sides of one of the vertical bars 14 that make up the bed structure.

The ends of the arms as well as the opposite edge of the plate, extend appreciable distances above the bar 10, where the arms 12 and plate are provided with aligning openings for the reception of the bolts 15 that are provided with wing nuts 16 on the threaded ends thereof, drawing the arms towards the opposite side of the plate to clamp the bar 10 to which the safety top is secured. In order to prevent marring the finish of the baby bed, cushioning members such as indicated at 17 are provided between the plate 9, arms 12, and the bar 10.

The reference character 18 indicates the cooperating section of the hinge which is secured to the rear side bar 7 of the safety top, and includes a tubular section held between the arms 12 in alignment with the tubular bearings 13 to receive the pivot pin 19 of the hinge whereby the safety top may be swung from an open position to a closed position, or vice versa.

Secured to the plate 9, and rising therefrom, is the vertical arm 20 which is provided with forwardly extended clamping arms 21 that have their free ends curved outwardly to permit the transverse member 8 of the safety top which falls directly opposite to the clamping arms, to pass between the clamping arms, the clamping arms being of a yieldable construction so that they will expand and grip the bar 8 to support the safety top in an open position. When it is desired to return the top to a closed position, a pull on the top will overcome the action of the clamping arms, releasing the safety top permitting it to be lowered.

Secured to the front edge of the safety top, are straps 22, which straps are provided with snap fasteners 23, whereby the straps may be wrapped around the upper side bar 10 at the front of the bed, and the snap fasteners positioned, holding the safety top in its closed position.

From the foregoing it is believed that the construction and operation of the safety top will be clear, and that further description as to the operation of the device is unnecessary.

Having thus described the invention, what is claimed is:

1. The combination with a baby bed and safety top for the bed including parallel side bars and transverse members, of a removable hinge embodying a clamp clamped around a side bar of the bed, said hinge including a hinge member secured to the safety top, pivotally connected with the clamp, an arm rising from the clamp, and yieldable clamping members extending laterally from the arm and clamping a transverse bar of the safety top, supporting the top in an elevated position.

2. The combination with a baby bed and safety top including parallel side bars and transverse bars, of a removable hinge embodying a clamp formed of a length of sheet metal material bent upon itself to provide a U-shaped member fitted over a side bar of the bed, said clamp having a cut out portion extending from one end thereof providing an opening accommodating a bar of said bed, means for securing the clamp in position on the bed, a hinged section pivotally connected with the clamp and secured to the safety top, hingedly connecting the top with the clamp, an arm rising from the clamp, and clamping members extending laterally from the free end of the arm and clamping a transverse bar of the safety top, securing the safety top in an elevated position.

3. The combination with a baby bed and safety top, the baby bed embodying side bars and vertical bars connected with the side bars, of a safety top including parallel side bars and transverse bars connected with the side bars, a removable hinge secured to a side bar of the bed, said removable hinge including a clamping member of substantially U-shaped formation fitted around the side bar of the bed with the free ends of the clamp extending above the side bar, bolts extended through the ends of the clamp securing the clamp in position, a hinged section secured to the top, pivotally connected with the clamp, and a supporting arm secured to the clamp and embodying clamping members extending laterally from the arm clamping a transverse bar of the safety top, securing the safety top in an elevated position.

JOHN E. REAM.

REFERENCES CITED

The following references are of record in the file of this patent:

UNITED STATES PATENTS

| Number | Name | Date |
|---|---|---|
| 545,930 | Wolff | Sept. 10, 1895 |
| 1,096,221 | Caldwell | May 12, 1914 |
| 1,321,905 | Gannon | Nov. 18, 1919 |
| 1,462,657 | Rainalter | July 24, 1923 |
| 1,624,467 | Boardman | Apr. 12, 1927 |